W. D. Sloan.
Hoop Skirt.

Nº 36677.   Patented Oct. 14. 1862.

Witnesses.
Wm H Bishop
A. DeLay

Inventor.
Wm D. Sloan.

UNITED STATES PATENT OFFICE.

WILLIAM D. SLOAN, OF NEW YORK, N. Y.

IMPROVEMENT IN HOOP-SKIRTS.

Specification forming part of Leters Patent No. 36,677, dated October 14, 1862.

*To all whom it may concern:*

Be it known that I, WILLIAM D. SLOAN, of the city, county, and State of New York, have invented a new and useful Improvement in Hoop-Skirts; and I do hereby declare that the following is a full, clear, and exact description thereof, reference being had to the accompanying drawings, making a part of this specification, in which—

Figure 1:
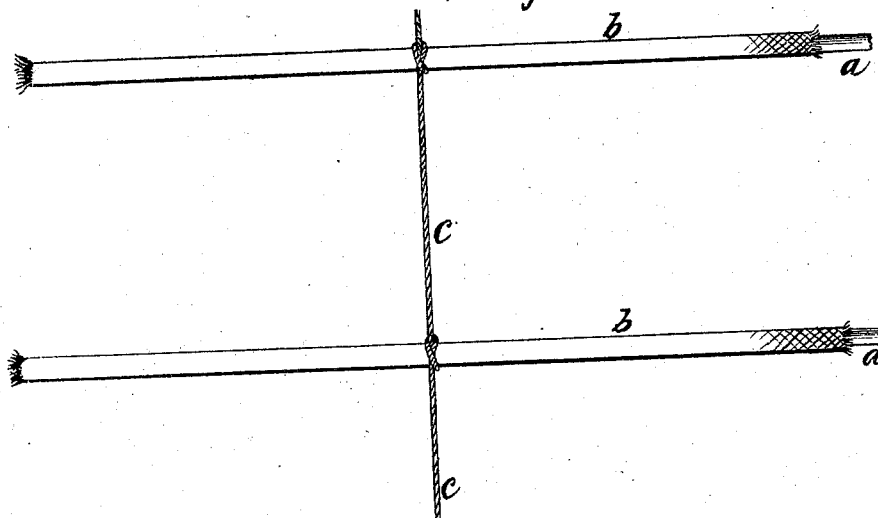
Figure 2:
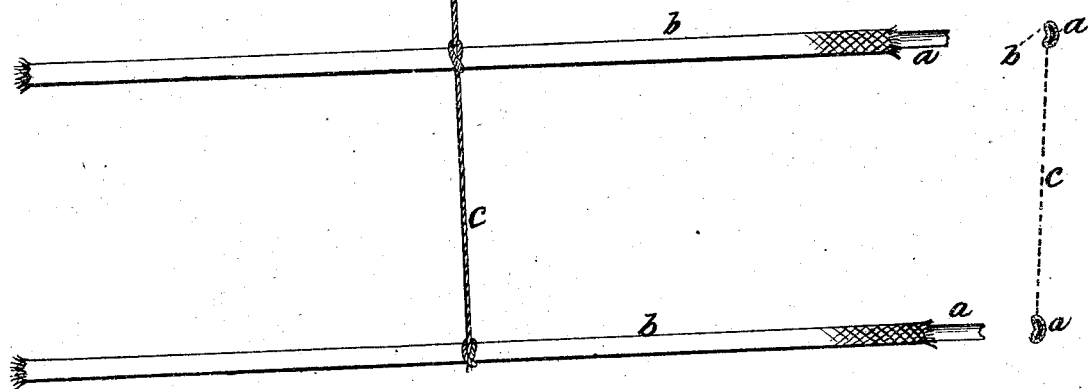

Figure 1 is an elevation of part of a skirt; Fig. 2, a cross-section, and Fig. 3 cross-sections of modifications of the form of the wire for the hoops.

The object of my invention in making hoop-skirts is to obtain the required amount of elasticity in the hoops with less weight than by any method heretofore known; and to this end my said invention consists in combining corrugated wire suitably wrapped or covered and formed into hoops with the cords, straps, or other equivalent means for connecting and holding the hoops.

I take steel or other suitable flat metal wire, and by rolling or other suitable means corrugate it so that in the cross-section it will be concave on one side and convex on the other, as represented at *a*. The wire so corrugated is then covered by braiding, as at *b*, or otherwise covered, and the wire so covered, after being made into hoops of suitable size, are connected by cords *c*, or by other suitable and equivalent means, and formed into a skirt.

Figure 3:
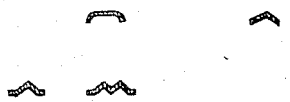

In making the hoops I prefer to put the concave face of the wires outward, as the hoops will then present a greater amount of stiffness for a given weight of metal than if put inward; but whether the concave face be put inward or outward, the required degree of spring-like firmness will be much greater for a given weight of metal than can be obtained by any other known mode; and although I prefer the form of corrugation represented in Fig. 2, I do not wish to limit myself to such form, as other forms may be substituted, as are represented in section at Fig. 3.

What I claim as my invention, and desire to secure by Letters Patent, is—

Combining corrugated wire suitably wrapped and formed into hoops, substantially as described, with cords, straps, or other equivalent means for connecting and holding the hoops, for the purpose set forth.

WM. D. SLOAN.

Witnesses:
WM. H. BISHOP,
A. DELACY.